United States Patent [19]

Royal et al.

[11] Patent Number: 4,848,198
[45] Date of Patent: Jul. 18, 1989

[54] CHIP BREAKING TOOL HOLDER

[75] Inventors: Harold J. Royal; Randall E. Deemer, both of Raleigh, N.C.

[73] Assignee: Kennametal Inc., Latrobe, Pa.

[21] Appl. No.: 184,512

[22] Filed: Apr. 21, 1988

[51] Int. Cl.[4] .............................................. B23B 3/00
[52] U.S. Cl. ...................................... 82/1.11; 407/11
[58] Field of Search ................... 407/11, 103, 107, 91, 407/100, 109; 29/DIG. 64, DIG. 66, DIG. 92; 285/111

[56] References Cited

U.S. PATENT DOCUMENTS

| | | | |
|---|---|---|---|
| 1,776,335 | 9/1930 | Rauzieres | 407/109 |
| 1,913,982 | 6/1933 | Fox | 285/111 |
| 2,338,716 | 1/1944 | Hardwick | 285/111 |
| 3,293,727 | 12/1966 | Simms | 407/11 |
| 3,375,742 | 4/1968 | Sturm | 407/11 |
| 3,889,520 | 6/1975 | Stoterle et al. | 407/11 |
| 4,561,681 | 12/1985 | Lebsock | 285/111 |
| 4,621,547 | 11/1986 | Yankoff . | |
| 4,695,208 | 9/1987 | Yankoff . | |

FOREIGN PATENT DOCUMENTS

| | | | |
|---|---|---|---|
| 706587 | 3/1965 | Canada | 407/109 |
| 1369096 | 10/1974 | United Kingdom | 407/11 |

Primary Examiner—Frederick R. Schmidt
Assistant Examiner—Robert Showalter
Attorney, Agent, or Firm—Thomas R. Trempus

[57] ABSTRACT

An hydraulic chip breaking tool holder is provided with a fluid coupler and seal assembly for transferring high pressure, chip breaking fluid from an outlet opening of the main body of the tool holder to an inlet opening of an attached nozzle cap. A coupler in the form of a dowel is interconnected between the openings. At least one of the openings includes a seal cavity having an outer wall. The dowel is inserted through the seal cavity. A deformable pressure sensitive seal is disposed within the seal cavity and extends around the dowel. The pressure of fluid passing through the tool holder causes the seal to radially expand and seal the area between the dowel and the outer wall of the seal cavity, thereby preventing fluid from escaping pst the seal.

11 Claims, 4 Drawing Sheets

CHIP BREAKING TOOL HOLDER

FIELD OF THE INVENTION

The present invention relates to tool holders, and more particularly to hydraulic chip breaking tool holders that direct a high velocity fluid jet against chip material for breaking the same into small pieces.

BACKGROUND OF THE INVENTION

Cutting tools for performing metal working operations generally comprise a cutting insert having a surface terminating in a cutting edge and a holder formed with a seat adapted to receive the cutting insert. The cutting insert is clamped within the holder in a position so that the cutting edge of the insert engages a workpiece to remove a chip of metal during machining operations such as turning, boring, profiling, milling, threading and grooving. If the chip is allowed to form a continuous length, it tends to wrap around the cutting insert, tool holder and/or workpiece. Thus, periodic interruptions of the machining operation may be required to remove the impacted or bundled chips. Additionally, the shearing movement of a continuous chip against the cutting insert or tool holder generates intense heat which may result in the formation of craters on the exposed surfaces of the cutting insert. Once these craters become deep enough, the cutting insert may be subject to cracking and failure. Thus, it is preferable that the chip be broken into small segments when sheared from the workpiece.

Prior attempts at breaking chips have included the use of a high velocity stream of fluid directed across the exposed surface of the cutting insert and beneath the chips to break the chips into small segments. This approach is disclosed in U.S. Pat. Nos. 4,695,208 and 4,621,547, both to Yankoff.

Yankoff's '208 patent discloses a tool holder which comprises a support bar formed with a C-shaped cavity. A mounting block, which includes a seat adapted to receive the insert, is secured within the C-shaped cavity. A clamping block is mounted within the cavity atop the mounting block by means of a machine screw which engages a beveled edge formed in the clamping block. The clamping block functions both to clamp the insert within the mounting block seat, and to direct a jet of high velocity fluid across the top surface of the insert for breaking chips sheared from the workpiece into small lengths.

To deliver fluid to the clamping block, the support bar is formed with a fluid passageway connected at one end to an exterior fluid delivery line and terminating at the side wall of the C-shaped cavity. An O-ring is fitted over the terminal end of the connector passageway. The clamping block is also formed with an internal passageway which terminates at a discharge orifice. The discharge orifice is positioned to direct a jet of high velocity fluid at the chip of metal being removed from the workpiece to break the chip into small segments. With the clamping block mounted in position within the cavity, the internal passageway of the clamping block engages the O-ring at the end of the fluid passageway in the support bar. Fluid is thus transferred between the support bar and clamping block.

A number of problems have been encountered with the tool holding device described in the '208 patent. First, because the clamping block is secured along its bevelled edge, it tends to cock to one side during machining operations so that a gap forms between the side wall of the C-shaped cavity and the clamping block. When system pressures in excess of 1,500 psi are reached, the O-ring sealing the connection between the fluid passageway in the support bar and the internal passageway in the clamping block disintegrates. Without the O-ring seal, there is a marked decrease in the velocity of the fluid discharged from the discharge orifice since much of the fluid passes through the gap between the support bar and clamping block.

In addition, there is a problem with the terminal end of the bevelled edge of the clamping block notching the tapered head of the set screw used to secure the clamping block. When the terminal end of the bevelled edge penetrates too deeply into the tapered head of the machine screw, it "locks" the machine screw so that it cannot be removed. Thus, some difficulty has been experienced in indexing the cutting insert.

SUMMARY AND OBJECTS OF THE INVENTION

The tool holder according to the present invention comprises a support bar formed with a seat for receiving a cutting insert and a bridge-type clamping block which functions both to clamp the insert within its seat and to direct a jet of high velocity fluid at the produced chip for breaking the chip into small segments. Because the bridge-type clamping block inherently forms a gap between the clamping block and the support bar, the tool holder of the present invention incorporates a fluid coupler and seal assembly for transferring fluid across the gap from the support bar to the clamping block or nozzle head.

A seal cavity is formed at the terminal end of the fluid passageway in the support bar and a dowel pin is pressed into the fluid passageway in the clamping block. The dowel pin projects downwardly from the clamping block, and with the clamping block mounted in position atop the support bar, extends through the seal cavity formed at the terminal end of the fluid passageway in the support bar. The dowel pin includes an internal passage which directs fluid from the support bar to the clamping block.

A deformable seal is disposed within the seal cavity and surrounds the dowel pin. When the system is pressurized, the fluid pressure exerts a force against the bottom of the deformable seal and forces it against the bottom of the clamping block. Once the deformable seal is moved against the bottom of the clamping block, the force applied to the seal causes it to radially expand against the wall of the cavity and the dowel pin thereby forming a water tight seal at high pressures.

Accordingly, it is a primary object of the present invention to provide a tool holder for directing a jet of high velocity fluid against chips removed from a workpiece so as to break the chips into small segments.

Another object of the present invention resides in the provision of a bridge-type clamping block which functions both to secure a cutting insert and to direct a jet of fluid at chips removed from the workpiece.

Another object of the invention resides in the provisions of a fluid coupler and seal capable of transferring fluid under high pressure across the gap between the clamping block and support bar.

A further object of the present invention is to provide an hydraulic chip breaking tool holder of the character referred to above that is provided with means for effectively and efficiently transferring high-pressure fluid across a bridge gap.

Still a further object of the present invention resides in the provision of a hydraulic chip breaking tool holder provided with a fluid coupler and seal assembly for transferring high-pressure chip breaking fluid across a bridge gap wherein the seal is deformable and pressure responsive so as to radially expand and form a very effective and tight seal around the fluid coupler thereby preventing fluid from escaping to the gap.

Other objects and advantages of the present invention will become apparent and obvious from a study of the following description and the accompanying drawings which are merely illustrative of such invention.

DETAILED DESCRIPTION OF THE INVENTION

Figure 1:
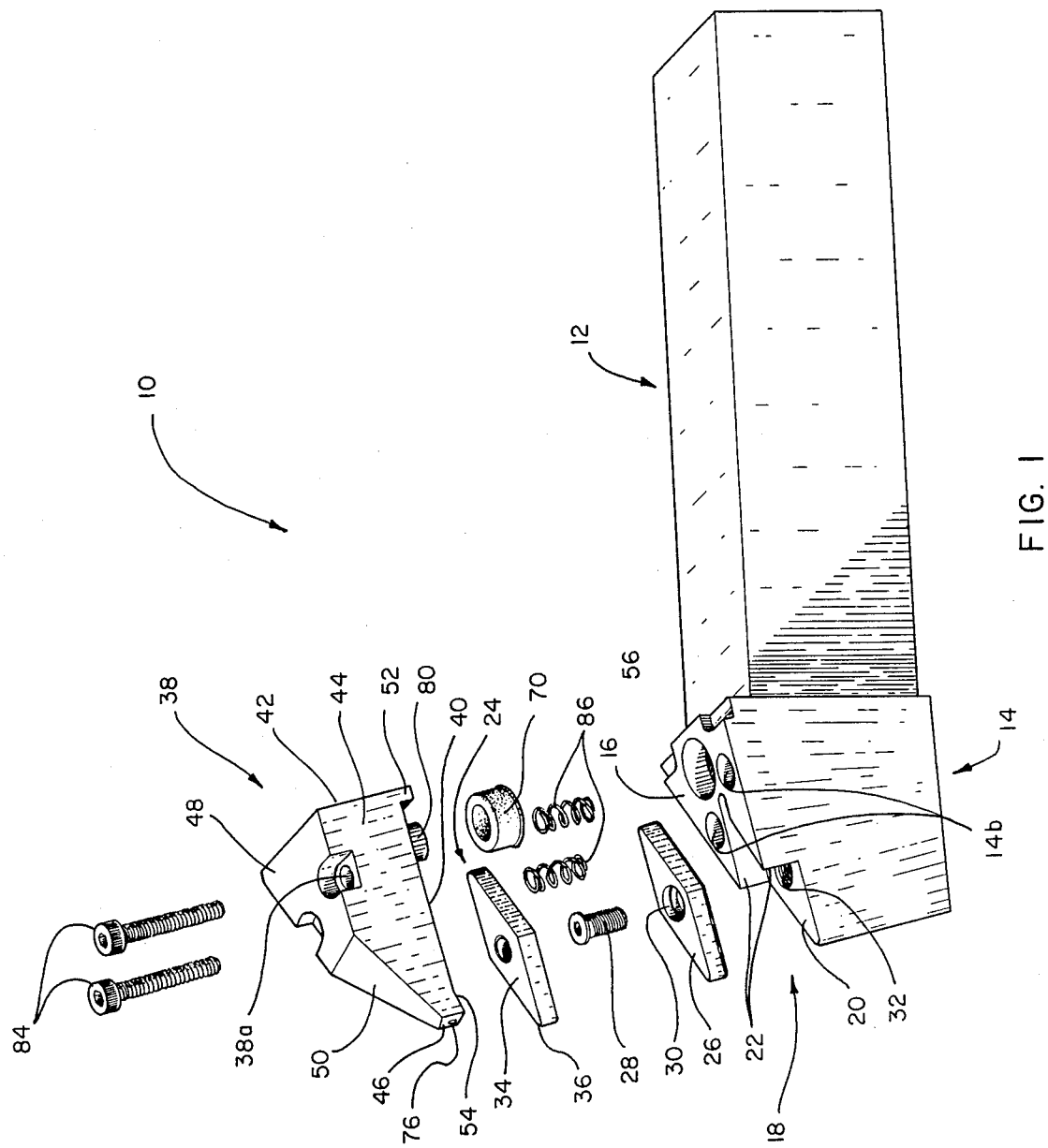
FIG. 1 is an exploded perspective view of the hydraulic chip breaking tool holder of the present invention.
Figure 2:
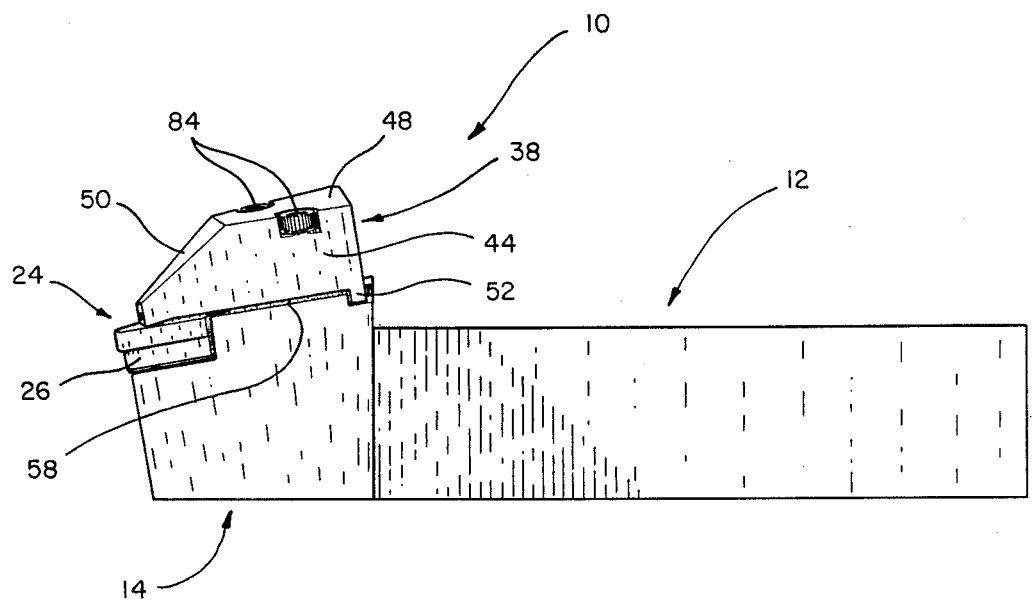
FIG. 2 is a side elevational view of the hydraulic chip breaking tool holder of the present invention.

Referring now to the drawings, the tool holder of the present invention is shown therein and indicated generally by the numeral 10. It should be understood that, while the tool holder 10 is illustrated in the drawings as a profiling holder for purposes of describing the invention, the geometry of the tool holder maybe modified to perform machining operations such as turning, grooving, and threading.

As shown in FIG. 1, the tool holder 10 includes a support bar 12 which terminates at a triangular shaped head 14. In top surface 16 of the triangular shaped head 14, there is formed an insert seat 18 including a bottom wall 20 and two angularly disposed side walls 22. Seat 18 is formed to receive a diamond shaped cutting insert 24 and shim 26. Shim 26 is secured to the bottom wall 20 by a screw 28 which extends through a recessed throughbore 30 formed in the shim 26 and into a threaded bore 32 formed in the bottom wall 20 of seat 18. Cutting insert 24 rests on top of the shim 26 so that its top surface 34 is exposed and the cutting edge 36 projects outwardly from the head 14.

Cutting insert 24 is clamped in place by a nozzle head or clamping block 38 which is mounted atop head 14 of support bar 12. Clamping block 38 functions both to clamp insert 24 within seat 18 and to direct a high velocity fluid jet across the top surface 34 of the insert 24 toward its cutting edge 36, as described in more detail below.

Clamping block 38 is a generally triangular shaped member having a bottom wall 40, rear wall 42, side walls 44, front wall 46, and a top wall 48 which includes an inclined forward portion 50. Projecting downwardly from the rear portion of bottom wall 40 is a pair of spaced legs 52. Bottom wall 40 is bent slightly downwardly, in an area adjacent front wall 46, to form a clamping tip 54.

Clamping block 38 is secured atop the head 14 by a pair of machine screws 84 which extend through recessed throughbores 38a in the clamping block 38 and into threaded bores 14a in the head 14. Coil springs 86 are disposed within a recessed area 14b at the top of threaded bores 14a to provide a force which tends to separate the clamping block 38 from the head 14 when screws 84 are loosened to allow the tool insert 24 to be conveniently indexed.

Support legs 52 of the clamping block 38 rest within support leg seats 56 formed in the top surface 16 of head 14, while the clamping tip 54 engages the top surface 34 of the cutting insert 24. The area of bottom wall 40 between the support legs 52 and clamping tip 54 bridges over the top surface of head 14 and thus leaves a gap or transition space 58 between the clamping block 38 and head 14. Because the bottom wall 40 of clamping block 38 does not rest on the top surface 16 of head 14, a downward force which would otherwise be transferred directly to the head 14 is applied to the cutting insert 24 to secure the same.

Figure 3:
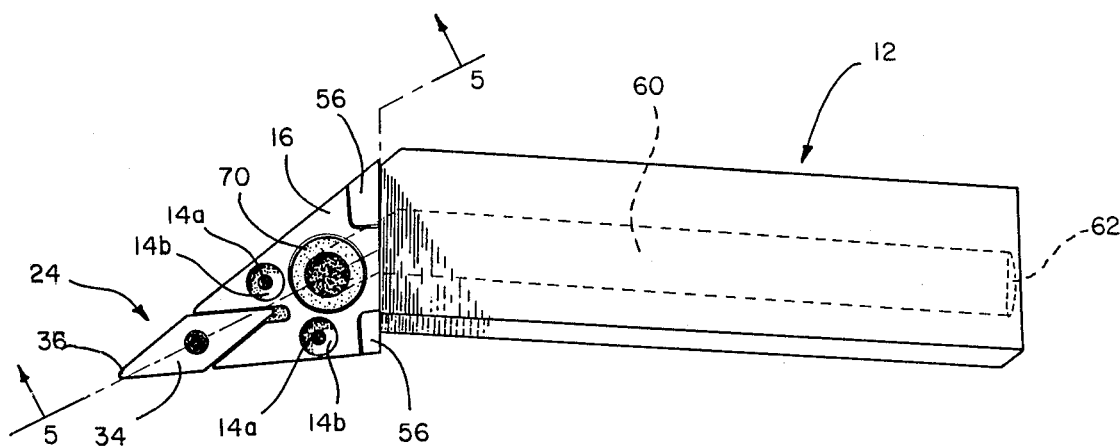
FIG. 3 is a top plan view of the hydraulic chip breaking tool holder of the present invention with the nozzle cap removed.
Figure 4:
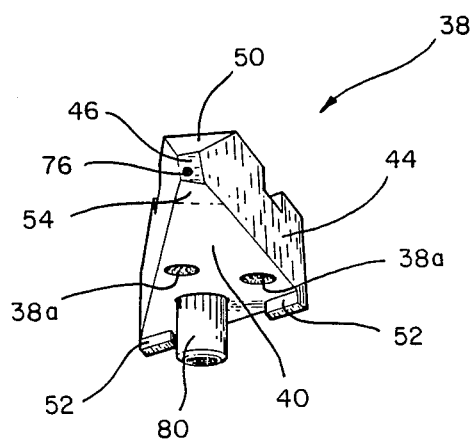
FIG. 4 is a perspective view of the nozzle cap.
Figure 5:
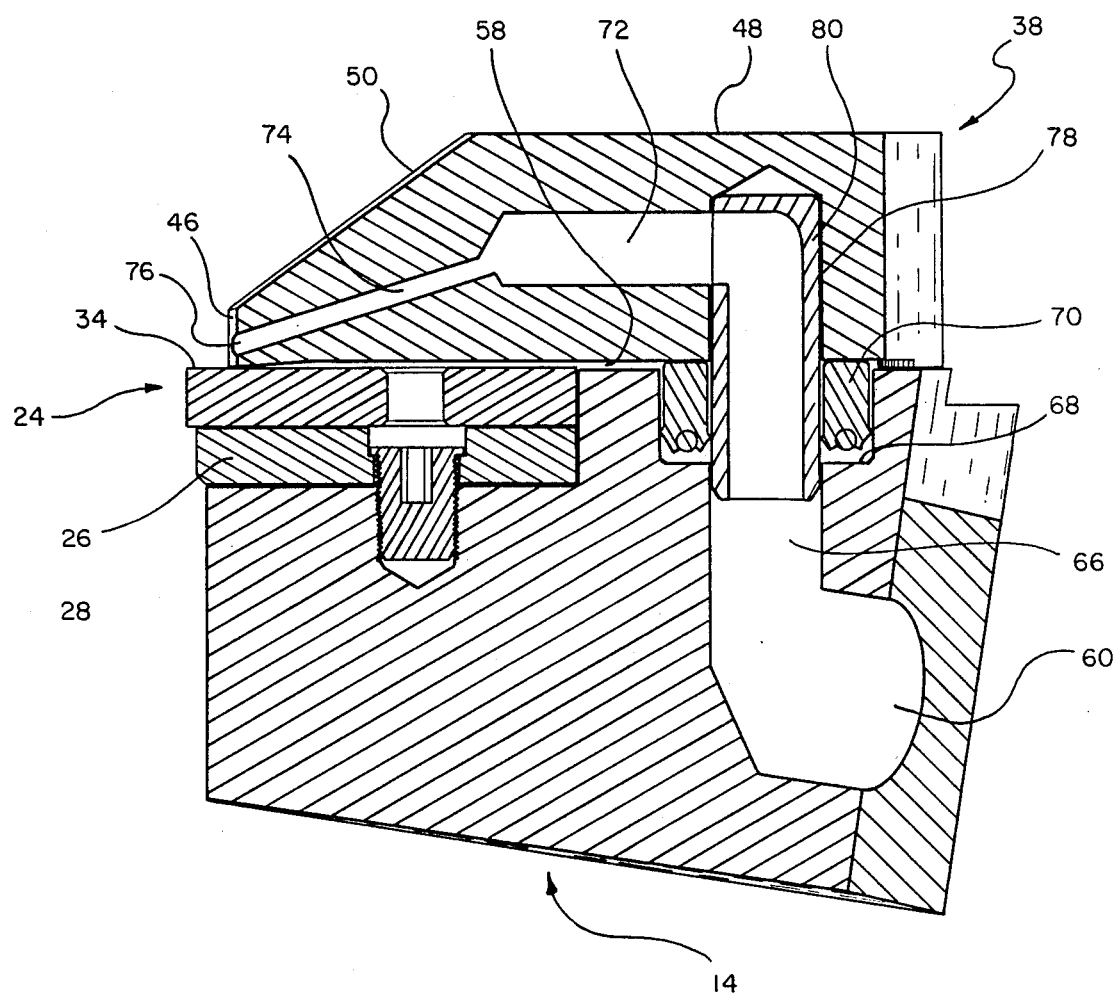
FIG. 5 is a sectional view taken along the lines 5—5 of FIG. 3 with the nozzle cap attached.

Referring now to FIGS. 3 and 5, the fluid delivery system of the invention is illustrated. The support bar 12 is formed with a main fluid passageway 60 which extends longitudinally from an inlet end 62 into the head 14. The inlet end 62 is threaded to receive a fitting (not shown) connected to an exterior fluid delivery line (not shown). The fluid delivery line connects to a pump (not shown) which generates pressure of up to about 3,000 pounds per square inch.

An intermediate passageway 66 connects to the terminal end of the main fluid passageway 60 and extends vertically from the main passageway 60 to the top surface 16 of head 14. The terminal end of the intermediate passageway 66 is enlarged by a counter bore which forms a seal cavity 68 and is adapted to receive a deformable seal 70.

Clamping block 38 is formed with a main transition passageway 72 which extends longitudinally through a substantial portion of the clamping block 38. A discharge passageway 74 extends from the forward end of the transition passageway 72 and terminates at a discharge orifice 76 formed in the front wall 46 of clamping block 38. An inlet passageway or opening 78 extends at a right angle from the transition passageway 72 to the bottom wall 40 of clamping block 38 (which is also referred to as a nozzle cap). A dowel pin 80 having an internal connecting passageway 82 is pressed into the inlet passageway 78.

With the clamping block 38 mounted in place atop the head 14, the dowel pin 80 extends through the counter bore and seal cavity 68 into the intermediate passageway 66.

A deformable and pressure responsive seal is disposed within the counter bore and seal cavity 68 and surrounds the dowel pin 80. As disposed, seal 70 seals the cavity between the dowel pin 80 and the outer wall of the counter bore 68.

When the system is pressurized, fluid pressure urges the deformable seal 70 against the bottom wall 40 of clamping block 38. Once the seal 70 seats against the bottom wall 40, fluid pressure applied to the bottom of the seal causes it to expand radially against the dowel pin 80 and the outer wall of the seal cavity 68 thus forming a watertight seal at high pressure. It is readily apparent therefore that fluid can be transferred across the gap 58 between the attached clamping block 38 and head 14 through the connecting passageway 82 in the dowel pin 80 without the escape of fluid through gap 58.

Fluid which is delivered into the clamping block 38 is directed through the transition passageway 72 and discharge passageway 74 to the discharge orifice 76. The diameters of the transition passageway 72 and discharge passageway 74 are sized to obtain an acceleration of the fluid within the discharge passageway 74 of up to 400 to 600 ft/s at pressures up to 3,000 psi. The fluid jet (not shown) is directed by the discharge orifice 76 across the top surface 34 of the cutting insert 24 and is aimed at the underside of the chips being sheared from the workpiece. For reasons described more fully in U.S. Pat. No. 4,621,547 to Yankoff, which is incorporated herein by reference, the fluid jet causes the chip to fracture and break into small segments. The fluid jet also has the effect of diminishing the intense heat generated by the engagement of the cutting insert with the workpiece and therefore increases the useful life of the cutting insert.

From the foregoing discussion and specification, it is seen that the present invention presents an hydraulic chip breaking tool holder with an effective and efficient fluid coupler and seal assembly for transferring high-pressure chip breaking fluid from the tool holder to the attached nozzle head. By extending the coupler or dowel 80 into both the nozzle head and the tool holder and appropriately sealing the dowel at its insertion points, a very efficient highpressure fluid transfer system is provided. With such a design, chip breaking fluid having pressures as high as 3,000 psi are readily transferred from the tool holder to the separately attached nozzle head without leakage or damage to the seal. It is also appreciated that the fluid coupler and seal design of the present invention enables the nozzle head to bridge clamp the tool insert, which is highly desirable, and still transfer fluid through the gap created by the bridge clamp.

The terms "top," "bottom," "forward," "rearward," etc., have been used herein merely for the convenience of the foregoing specification and in the appended claims to describe the Hydraulic Chip Breaking Tool Holder and its parts as oriented in the drawings. It is understood, however, that these terms are in no way limiting to the invention since the Hydraulic Chip Breaking Tool Holder may obviously be disposed in many different positions when in active use.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A hydraulic chip breaking tool holder for receiving a tool insert having a top clamping surface terminating with a cutting edge, comprising:
    (a) a support bar having a top surface formed with an insert seat adapted to receive the tool insert such that the clamping surface is exposed and the cutting edge projects outwardly from the support bar for engaging a workpiece and removing chips of metal therefrom;
    (b) a nozzle cap including a bottom surface and multi-contact points mounted atop the support bar such that a gap is defined between the bottom surface of the nozzle cap and the top surface of the support bar, the nozzle cap including a clamping tip for engaging the exposed clamping surface of the tool insert;
    (c) a first fluid passage formed in the support bar and including an outlet opening formed in the top surface thereof;
    (d) a second fluid passage formed in the nozzle cap which extends from an entrance opening formed in the bottom surface thereof to a discharge orifice lying adjacent the tool insert; and
    (e) a fluid coupler and seal assembly interconnected between the support bar and nozzle cap for transferring fluid therebetween including:
        (1) a dowel pin extending through the gap and having an internal fluid passage interconnected between the entrance and outlet openings and inserted through at least one of the openings;
        (2) a seal cavity formed in the support bar and having an outer wall formed around the opening through which the dowel pin is inserted and wherein the seal cavity is communicatively open to the first fluid passageway formed in the support bar; and
        (3) a deformable pressure responsive seal disposed within the seal cavity and surrounding the dowel pin and wherein pressure associated with fluid passing through the first passageway of the support block urges the seal axially along the dowel pin and away from the seal cavity into and through the defined gap between the support block and nozzle cap where the bottom surface of the nozzle cap engages and confines the seal within the defined gap while a portion of the seal remains within the seal cavity, and wherein the seal is held in compression within the defined space by fluid pressure and the bottom surface of the nozzle cap causing the seal to radially expand and form a fluid tight seal across the gap and around the dowel pin.

2. The hydraulic chip breaking tool holder of claim 1 wherein the multi-contact points form a bridge-type clamping configuration between the nozzle cap and the top surface of the support bar.

3. The hydraulic chip breaking tool holder of claim 2 wherein the multi-contact points includes a pair of contact feet longitudinally spaced from the clamping tip and extending downwardly from the nozzle cap for engagement with the top surface of the support bar whereby the clamping tip's engagement with the tool insert and the engagement of the contact feet with the top surface of the support bar form the bridge clamping configuration.

4. The hydraulic chip breaking tool holder of claim 1 wherein the seal cavity includes an open top and a lower fluid containing portion that is communicatively open to the fluid passageway in the support bar such that in operation chip breaking fluid is held within the fluid containing portion of the seal cavity and wherein the pressure associated with the chip breaking fluid held within the fluid containing portion of the seal cavity acts to urge the deformable pressure seal upwardly through the open top of the seal cavity.

5. In a hydraulic chip breaking tool holder of the type comprising a nozzle head having a base with a fluid inlet opening formed therein secured to a tool holder head portion having a base with an outlet opening, and means for channelling pressurized fluid into the head portion and out the outlet opening thereof into and through the inlet opening of the nozzle head, the improvement comprising a combined multi-point nozzle head clamping arrangement and sealed fluid coupler assembly for directing fluid from the outlet opening of the head portion into and through the inlet opening of the nozzle head, comprising:

(a) a plurality of contact points extending from the base of the nozzle head for engagement with the base of the tool holder head portion so as to define a gap between the nozzle head and tool holder head portion and the respective fluid openings thereof;

(b) a connecting fluid coupler communicatively connected between the inlet opening of the nozzle head and the outlet opening of the head portion and extending through the defined gap;

(c) the connecting fluid coupler extending into and through at least one of the openings of the nozzle head and head portion;

(d) a seal cavity formed about the opening through which the fluid coupler extends and including an outer wall and wherein the seal cavity is communicatively open to the pressurized fluid passing from the tool holder head portion to the nozzle head; and (e) a deformable pressure responsive seal disposed within the seal cavity and surrounding the fluid coupler and responsive to the pressurized fluid acting on the same so as to protect from the seal cavity into and through the formed gap with the seal assuming a position within the gap and confined therein by the base of the nozzle head or tool holder head portion disposed opposite the seal cavity whereby the seal is effectively compressed and thereby radially expands within the gap to seal the gap around the fluid coupler and between the fluid openings within the nozzle head and tool holder head portion.

6. The improved hydraulic chip breaking tool holder of claim 5 wherein the fluid coupler comprises an elongated dowel having one end pressed into the inlet opening of the nozzle head and having another end extending from the nozzle head.

7. The improved chip breaking tool holder of claim 6 wherein the seal cavity is formed within the outlet opening of the head portion and wherein the end portion of the dowel extending from the nozzle head is extended through the seal.

8. The improved hydraulic chip breaking tool holder of claim 5 wherein the seal cavity includes an open top and a lower fluid containing portion that is commuicatively open to the pressurized fluid passing from the tool holder head portion to the nozzle head such that in operation chip breaking fluid is held within the fluid containing portion of the seal cavity and the pressure of the chip breaking fluid contained within the fluid containing portion of the seal cavity acts on the deformable seal to urge the same through the open top of the seal cavity.

9. A hydraulic chip breaking tool holder for receiving a tool insert having a top clamping surface terminating with a cutting edge, comprising:

(a) a support bar having a top surface formed with an insert seat adapted to receive the tool insert such that the clamping surface is exposed and the cutting edge projects outwardly from the support bar for engaging a workpiece and removing chips of metal therefrom;

(b) a nozzle cap secured to the top surface of the support bar and including a bottom surface and a clamping tip that extends over the support bar for bridge clamping the tool insert into the seat, and wherein the bridge clamping of the tool insert forms a gap between the nozzle cap and the support bar;

(c) a first fluid passage formed in the support bar and including an outlet opening formed in the top surface thereof;

(d) a second fluid passageway formed in the nozzle cap and communicatively connected to an inlet opening formed in the bottom surface of the nozzle cap;

(e) a seal cavity having an outer wall formed in the outlet opening of the support bar and communicatively open to the fluid passage formed in the support bar;

(f) a dowel including an internal passageway and having one end portion pressed into the inlet opening of the nozzle cap and having a second end portion extending downwardly from the bottom surface of the nozzle cap and extending through the formed gap and into and through the outlet opening within the support bar; and (g) a deformable pressure responsive seal having a height greater than the height of the formed gap and disposed within the seal cavity and extending around the dowel passing therethrough, the seal being positioned about the dowel such that the pressure of fluid passing through the dowel into the nozzle cap causes the seal to ride up the dowel and through the gap and abut against the bottom surface of the nozzle cap whereupon the seal is compressed and radially expands and seals the area between the dowel and the outer wall of the seal cavity while assuming a sealing position within the formed gap.

10. A method of point clamping a tool insert with a high pressure chip breaking nozzle cap and sealing a high pressure fluid coupler that passes through a gap formed between the nozzle cap and a supporting tool holder comprising:

(a) point clamping a tool insert to the tool holder so as to define a gap between opposed surfaces of the nozzle cap and tool holder;

(b) connecting a fluid coupler between outlet and inlet openings formed in the opposed surfaces of the nozzle cap and tool holder;

(c) extending the fluid coupler into and through at least one of the openings;

(d) forming a seal cavity with an outer wall about the fluid coupler about the opening that the fluid coupler extends through;

(e) inserting a deformable pressure responsive seal into the seal cavity and around the fluid coupler extending therethrough;

(f) transferring pressurized chip breaking fluid from the tool holder, through the fluid coupler, and into the nozzle cap; and (g) directing the pressurized chip breaking fluid against the seal and urging the seal from the seal cavity, through the gap, and into engagement with the opposed surface opposite the seal cavity thereby effectively compressing the seal, and maintaining the seal within the gap where the seal is effectively expanded radially and forms a tight seal around the fluid coupler through the entire gap.

11. The method of claim 10 wherein the fluid coupler includes a dowel and the method further includes the step of press fitting one end of the dowel into the inlet opening of the nozzle cap and inserting the other end of the dowel into and through the deformable seal and the seal cavity surrounding the seal.

* * * * *